United States Patent
Micks et al.

(10) Patent No.: US 10,800,455 B2
(45) Date of Patent: Oct. 13, 2020

(54) VEHICLE TURN SIGNAL DETECTION

(71) Applicant: Ford Global Technologies, LLC, Dearborn, MI (US)

(72) Inventors: Ashley Elizabeth Micks, Mountain View, CA (US); Harpreetsingh Banvait, Sunnyvale, CA (US); Jinesh J Jain, San Mateo, CA (US); Brielle Reiff, Cincinnati, OH (US); Sneha Kadetotad, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/973,454

(22) Filed: Dec. 17, 2015

(65) Prior Publication Data

US 2017/0174261 A1  Jun. 22, 2017

(51) Int. Cl.
| | |
|---|---|
| *B62D 15/02* | (2006.01) |
| *B60W 30/00* | (2006.01) |
| *B62D 6/00* | (2006.01) |
| *G05D 1/02* | (2020.01) |

(52) U.S. Cl.
CPC .......... *B62D 15/029* (2013.01); *B60W 30/00* (2013.01); *B62D 6/00* (2013.01); *B62D 15/0255* (2013.01); *B62D 15/0265* (2013.01); *G05D 1/0276* (2013.01)

(58) Field of Classification Search
CPC .................................................. B62D 15/029
See application file for complete search history.

(56) References Cited

U.S. PATENT DOCUMENTS

| | | | |
|---|---|---|---|
| 7,065,245 B2 | 6/2006 | Toda | |
| 7,565,006 B2 * | 7/2009 | Stam | B60Q 1/085 315/82 |
| 8,615,357 B2 | 12/2013 | Simon | |
| 8,660,734 B2 | 2/2014 | Zhu | |
| 8,903,588 B2 * | 12/2014 | Schmudderich | B60W 30/0956 701/23 |
| 9,014,905 B1 | 4/2015 | Kretzschmar | |
| 9,091,558 B2 | 7/2015 | Su | |
| 9,159,023 B2 * | 10/2015 | Bone | B60W 30/18163 |

(Continued)

OTHER PUBLICATIONS

Duan-Yu Chen. Yang-Jie Peng, Li-Chih Chen, Jun-Wei Hsieh, Nighttime Turn Signal Detection by Scatter Modeling and Reflectance-Based Direction Recognition, IEEE.org, Feb. 14, 2014.

(Continued)

*Primary Examiner* — Michael A Berns
(74) *Attorney, Agent, or Firm* — David R. Stevens; Stevens Law Group

(57) ABSTRACT

Systems, methods, and devices for detecting a vehicle's turn signal status for collision avoidance during lane-switching maneuvers or otherwise. A method includes detecting, at a first vehicle, a presence of a second vehicle in an adjacent lane. The method includes identifying, in an image of the second vehicle, a sub-portion containing a turn signal indicator of the second vehicle. The method includes processing the sub-portion of the image to determine a state of the turn signal indicator. The method also includes notifying a driver or performing a driving maneuver, at the first vehicle, based on the state of the turn signal indicator.

17 Claims, 6 Drawing Sheets

(56) References Cited

U.S. PATENT DOCUMENTS

| | | | |
|---|---|---|---|
| 9,164,511 B1* | 10/2015 | Ferguson | G05D 1/0231 |
| 9,708,004 B2* | 7/2017 | Weisswange | G06K 9/00791 |
| 9,944,317 B2* | 4/2018 | Lee | G06K 9/00798 |
| 2012/0314070 A1 | 12/2012 | Zhang | |
| 2015/0192428 A1 | 7/2015 | Nemec | |
| 2016/0091609 A1* | 3/2016 | Ismail | G01S 19/49 |
| | | | 702/150 |
| 2016/0214647 A1* | 7/2016 | Weisswange | B62D 15/029 |
| 2016/0339959 A1* | 11/2016 | Lee | B62D 15/0265 |

OTHER PUBLICATIONS

Almagambetov, A., Casares, M., Velipasalar, S., Autonomous tracking of vehicle rear lights and detection of brakes and turn signals, IEEE.org, Jul. 11-13, 2012.

\* cited by examiner

VEHICLE TURN SIGNAL DETECTION

TECHNICAL FIELD

The disclosure relates generally to methods, systems, and apparatuses for automated driving or for assisting a driver, and more particularly relates to methods, systems, and apparatuses for detecting a vehicle's turn signal status for collision avoidance during lane-switching maneuvers or otherwise.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. However, due to the dangers involved in driving and the costs of vehicles, it is extremely important that autonomous vehicles and driving assistance systems operate safely and are able to accurately navigate roads and avoid other vehicles even in situations where both autonomous vehicles and human-driven vehicles are present. In the case of lane-switching, merging or other road maneuvers in which two vehicles, such as an autonomous vehicle and a non-autonomous vehicle, may attempt to merge into the same lane, or change lanes near each other it is important to detect the other vehicle's status, including its turn signal status for collision avoidance.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
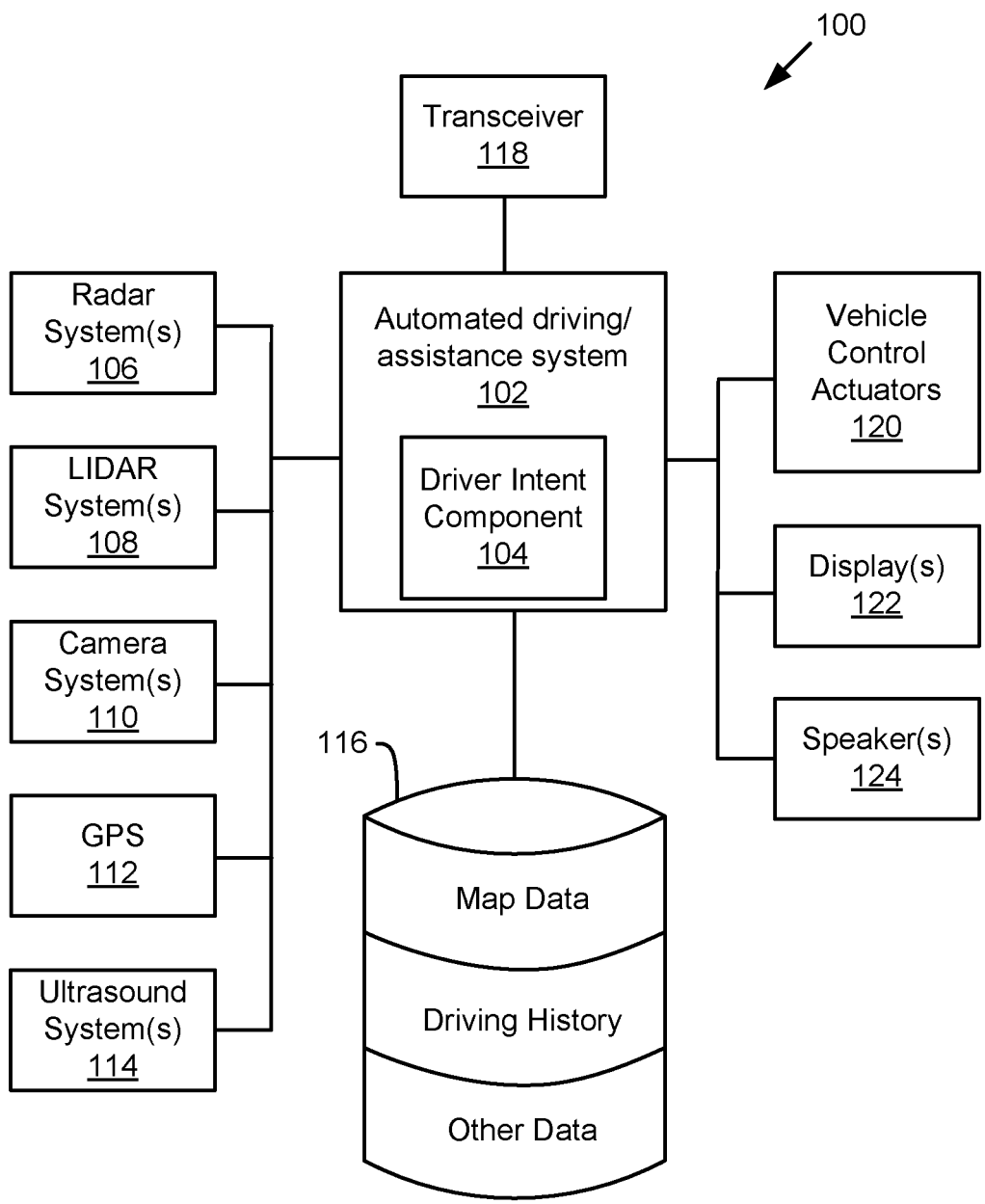
FIG. 1 is a schematic block diagram illustrating an implementation of a vehicle control system that includes an automated driving/assistance system.

Applicants have recognized that, at least during any transition period in which both autonomous and manually-driven vehicles will be on the road, it is important that autonomous vehicles accurately predict the actions of human drivers. Detection of a turn signal of a vehicle used by another driver adds certainty to the future actions of that driver in maneuvering the vehicle. This can be useful in the case of highway lane-switching in which two vehicles, such as an autonomous vehicle and a non-autonomous vehicle, may attempt to merge into the same lane, or change lanes near each other. By detecting the turn signal of the other vehicle, the autonomous vehicle can detect if the other vehicle is attempting to enter its intended path and therefore avoid a possible collision. This detection could also be beneficial for a driver assisted vehicle that is performing a lane change or otherwise. Upon recognizing its driver's intent to change lanes (e.g., based on activation of a turn signal on an assisted vehicle), the assisted vehicle could notify its driver if another vehicle is predicted to move into the same lane.

This disclosure presents systems, methods, and apparatuses for autonomous driving systems or driving assistance systems to predict or detect lane changes of nearby vehicles. In one embodiment, a system uses the status of an external vehicle's turn signals in order to predict the motion of that vehicle for decision-making in highway lane-change maneuvers. The assisted vehicle can be equipped with 360 degree sensing system including, but not limited to, a camera, LIDAR, radar, and/or other range-finding or imaging sensors. Computer vision and sensor fusion algorithms employing deep neural networks may be trained to recognize the turn signal regions of interest on the vehicle. The neural networks may also be used to identify whether the turn signal is on, possibly through comparison of the vehicle's visible turn signals, which may not be active all at the same time. In one embodiment, the system may be configured to perform the following: locate nearby vehicles that are moving in adjacent lanes; locate and determine bounding boxes for visible turn signals on adjacent vehicles; send image data within turn signal bounding box to computer vision algorithm to recognize which signals are in use; and input turn signal status into lane-changing decision matrix so that the system, or another system, can make a lane change or driving maneuver decision. Even under conditions where another vehicle has the turn signal indicators on by mistake, or a driver has just forgotten to turn them off, this information may be useful as an indication to pay extra attention to that vehicle and track it closely for potential simultaneous merges until the turn signal indicators are switched off or the other vehicle is out of zone of possible risk.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash computer, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

Referring now to the figures, FIG. 1 illustrates a vehicle control system 100 that includes an automated driving/assistance system 102. The automated driving/assistance system 102 may be used to automate, assist, or control operation of a vehicle, such as a car, truck, van, bus, large truck, emergency vehicles or any other automobile for transporting people or goods, or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 includes a driver intent component 104, which may predict a future movement of other vehicles based on one or more of turn signal indicators and vehicle movement. For example, the driver intent component 104 may estimate an intention of the driver of a different vehicle (e.g., a vehicle that does not include the vehicle control system 100) based on a turn signal state of the different vehicle.

The vehicle control system 100 also includes one or more sensor systems/devices for detecting a presence of nearby objects or determining a location of a parent vehicle (e.g., a vehicle that includes the vehicle control system 100) or nearby objects. For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication with a mobile or wireless network, other vehicles, infrastructure, or any other communication system. The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. The display 122 may include a heads-up display, a dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation. For example, the driver intent component 104 may be separate from the automated driving/assistance system 102 and the data store 116 may be included as part of the automated driving/assistance system 102 and/or part of the driver intent component 104.

The radar system 106 may include any radar system known in the art. In general, a radar system 106 operates by transmitting radio signals and detecting reflections off objects. In ground applications, the radar may be used to detect physical objects, such as other vehicles, parking barriers or parking chocks, landscapes (such as trees, cliffs, rocks, hills, or the like), road edges, signs, buildings, or other objects. The radar system 106 may use the reflected radio waves to determine a size, shape, distance, surface texture, or other information about a physical object or material. For example, the radar system 106 may sweep an area to obtain data about objects within a specific range and viewing angle of the radar system 106. In one embodiment, the radar system 106 is configured to generate perception information from a region near the vehicle, such as one or more regions nearby or surrounding the vehicle. For example, the radar system 106 may obtain data about regions of the ground or vertical area immediately neighboring or near the vehicle. The radar system 106 may include one of many widely available commercially available radar systems. In one embodiment, the radar system 106 may provide perception data including a two dimensional or three-dimensional map or model to the automated driving/assistance system 102 for reference or processing.

The LIDAR system 108 may include any LIDAR system in the art. In general, the LIDAR system 108 operates by emitting visible wavelength or infrared wavelength lasers and detecting reflections of the laser light off objects. In ground applications, the lasers may be used to detect physical objects, such as other vehicles, parking barriers or parking chocks, landscapes (such as trees, cliffs, rocks, hills, or the like), road edges, signs, buildings, or other objects. The LIDAR system 108 may use the reflected laser light to determine a size, shape, distance, surface texture, or other information about a physical object or material. For example, the LIDAR system 108 may sweep an area to obtain data or objects within a specific range and viewing angle of the LIDAR system 108. For example, the LIDAR system 108 may obtain data about regions of the ground or vertical area immediately neighboring or near the vehicle. The LIDAR system 108 may include one of many widely available commercially available LIDAR systems. In one embodiment, the LIDAR system 108 may provide perception data including a two dimensional or three-dimensional model or map of detected objects or surfaces.

The camera system 110 may include one or more cameras, such as visible wavelength cameras or infrared cameras. The camera system 110 may provide a video feed or periodic images, which can be processed for object detection, road identification and positioning, or other detection or positioning. In one embodiment, the camera system 110 may include two or more cameras, which may be used to provide ranging (e.g., detecting a distance) for objects within view. In one embodiment, image processing may be used on captured camera images or video to detect vehicles, turn signals, drivers, gestures, and/or body language of a driver. In one embodiment, the camera system 110 may include cameras that obtain images for two or more directions around the vehicle.

The GPS system 112 is one embodiment of a positioning system that may provide a geographical location of the vehicle based on satellite or radio tower signals. GPS systems 112 are well known and widely available in the art. Although GPS systems 112 can provide very accurate positioning information, GPS systems 112 generally provide little or no information about distances between the vehicle and other objects. Rather, they simply provide a location, which can then be compared with other data, such as maps, to determine distances to other objects, roads, or locations of interest.

The ultrasound system 114 may be used to detect objects or distances between a vehicle and objects using ultrasonic waves. For example, the ultrasound system 114 may emit ultrasonic waves from a location on or near a bumper or side panel location of a vehicle. The ultrasonic waves, which can travel short distances through air, may reflect off other objects and be detected by the ultrasound system 114. Based on an amount of time between emission and reception of reflected ultrasonic waves, the ultrasound system 114 may be able to detect accurate distances between a bumper or side panel and any other objects. Due to its shorter range, ultrasound systems 114 may be more useful to detect objects during parking or to detect imminent collisions during driving.

In one embodiment, the radar system(s) 106, the LIDAR system(s) 108, the camera system(s) 110, and the ultrasound system(s) 114 may detect environmental attributers or obstacles near a vehicle. For example, the systems 106-110 and 114 may detect other vehicles, pedestrians, people, animals, a number of lanes, lane width, shoulder width, road surface curvature, road direction curvature, rumble strips, lane markings, presence of intersections, road signs, bridges, overpasses, barriers, medians, curbs, or any other details about a road. As a further example, the systems 106-110 and 114 may detect environmental attributes that include information about structures, objects, or surfaces near the road, such as the presence of drive ways, parking lots, parking lot exits/entrances, sidewalks, walkways, trees, fences, buildings, parked vehicles (on or near the road), gates, signs, parking strips, or any other structures or objects.

The data store 116 stores map data, driving history, and other data, which may include other navigational data, settings, or operating instructions for the automated driving/assistance system 102. The map data may include location data, such as GPS location data, for roads, parking lots, parking stalls, or other places where a vehicle may be driven or parked. For example, the location data for roads may include location data for specific lanes, such as lane direction, merging lanes, highway or freeway lanes, exit lanes, or any other lane or division of a road. The location data may also include locations for one or more parking stall in a parking lot or for parking stalls along a road. In one embodiment, the map data includes location data about one or more structures or objects on or near the roads or parking locations. For example, the map data may include data regarding GPS sign location, bridge location, building or other structure location, or the like. In one embodiment, the map data may include precise location data with accuracy within a few meters or within sub meter accuracy. The map data may also include location data for paths, dirt roads, or other roads or paths, which may be driven by a land vehicle.

The transceiver 118 is configured to receive signals from one or more other data or signal sources. The transceiver 118 may include one or more radios configured to communicate according to a variety of communication standards and/or using a variety of different frequencies. For example, the transceiver 118 may receive signals from other vehicles. Receiving signals from another vehicle is referenced herein as vehicle-to-vehicle (V2V) communication. In one embodiment, the transceiver 118 may also be used to transmit information to other vehicles to potentially assist them in locating vehicles or objects. During V2V communication the transceiver 118 may receive information from other vehicles about their locations, previous locations or states, other traffic, accidents, road conditions, the locations of parking barriers or parking chocks, or any other details that may assist the vehicle and/or automated driving/assistance system 102 in driving accurately or safely. For example, the transceiver 118 may receive updated models or algorithms for use by a driver intent component 104 in detecting vehicle movement, turn signals, or body language of a driver of another vehicle.

The transceiver 118 may receive signals from other signal sources that are at fixed locations. Infrastructure transceivers may be located at a specific geographic location and may transmit its specific geographic location with a time stamp. Thus, the automated driving/assistance system 102 may be able to determine a distance from the infrastructure transceivers based on the time stamp and then determine its location based on the location of the infrastructure transceivers. In one embodiment, receiving or sending location data from devices or towers at fixed locations is referenced herein as vehicle-to-infrastructure (V2X) communication. V2X communication may also be used to provide information about locations of other vehicles, their previous states, or the like. For example, V2X communications may include information about how long a vehicle has been stopped or waiting at an intersection, highway on-ramp signal, or the like. In one embodiment, the term V2X communication may also encompass V2V communication.

In one embodiment, the automated driving/assistance system 102 is configured to control driving or navigation of a parent vehicle. For example, the automated driving/assistance system 102 may control the vehicle control actuators 120 to drive a path on a road, parking lot, through an intersection, driveway or other location. For example, the automated driving/assistance system 102 may determine a path and speed to drive based on information or perception data provided by any of the components 106-118. As another example, the automated driving/assistance system 102 may determine when to change lanes, merge, or when to leave space for another vehicle to change lanes, or the like.

In one embodiment, the driver intent component 104 is configured to determine an intent of a driver of a nearby vehicle and/or predict a future movement, and timing for the movement, of a vehicle under control of a human driver. For example, the driver intent component 104 is configured to determine whether or not to change lanes or to determine the timing to change lanes.

Figure 2:
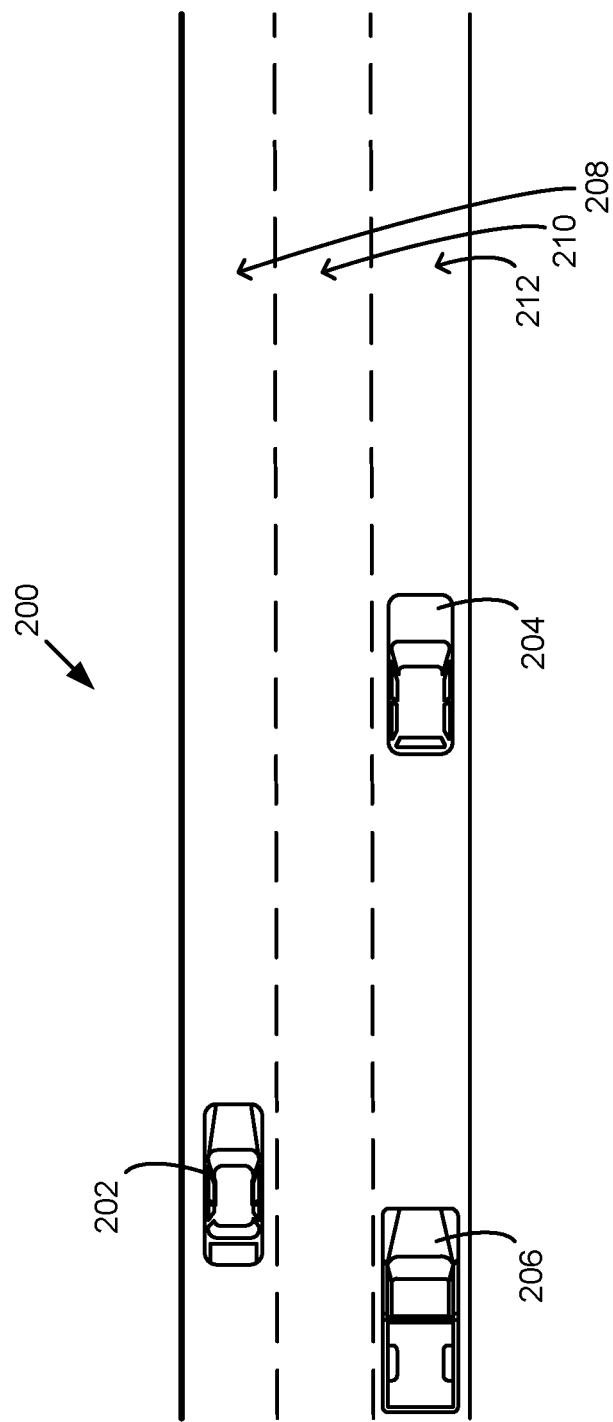
FIG. 2 is a schematic diagram illustrating a top view of vehicles on a multi-lane road.

FIG. 2 is a schematic top view of a roadway 200 with a vehicle 202 traveling on the roadway. The vehicle 202 is traveling in a first lane 208 of the roadway 200. The roadway also includes a second lane 210 and a third lane 212 that have a same direction of travel as the first lane 208. Additional vehicles 204 and 206 are also traveling along the roadway 200 in the third lane 212. The vehicle 202 may include the system 100 of FIG. 1. In one embodiment, one or more sensors, such as the camera system 110, may gather perception data of the road 200 and regions around the vehicle 202. A viewing area of the camera system 110, the LIDAR system 108, the radar system 106 or other system may extend in any direction or all directions around the vehicle 202. The vehicle 202, or a driver intent component 104 of the vehicle 202, may receive perception data from the sensors and detect the presence of other vehicles, objects, surfaces, or the like within a viewing range of the vehicle 202. For example, the vehicle 202 may detect and identify additional vehicles 204 and 206 as nearby vehicles.

In one embodiment, the vehicle 202 may detect a presence of the additional vehicles 204 and 206 in other lanes of the roadway 200. In one embodiment, the vehicle 202 may capture one or more images of the additional vehicles and identify a sub-portion of the captured images that corresponds to locations of turn signals on the other vehicles that are visible in the images. For example, the vehicle 202 may process the captured images using a neural network to identify regions that are likely to correspond to a location of turn signals. The vehicle 202 may analyze or process the sub-portion of the perception data (or image) to determine a state of a turn signal. Based on the state of the turn signal, the vehicle 202 may notify a driver to delay changing lanes into the second lane 210 or may cause an autonomous driving system to delay changing lanes into the second lane 210.

The vehicle control system 100 of FIG. 1 may help warn or prevent the vehicle 202 from merging into a lane at the same time as another vehicle, or may warn a driver or cause the vehicle 202 to slow down or speed up to allow another vehicle to merge into the vehicle's 202 current lane, such as 208. Notifications and determinations that vehicles are changing lanes may help reduce accidents between moving vehicles traveling in a same or similar direction along a roadway. For example, the vehicle 202 may detect when the additional vehicle 204 has a left turn signal on and thus the vehicle 202 should wait or avoid changing lanes into the second lane 210. If the additional vehicle 204 were already in the second lane 210, then the vehicle 202 may detect the left turn signal of vehicle 204 and inform the driver (or an automated driving system) that the vehicle 202 should slow down to let the additional vehicle 204 to enter into the first lane 208 in front of the vehicle 202. As another example, the vehicle 202 may detect that the additional vehicle 206 is changing from the third lane 212 into the second lane 210. If the additional vehicle 206 is within the second lane 210 with a left turn signal on, then the vehicle 202 may speed up to allow the additional vehicle 206 to enter into the first lane 208 behind the vehicle 202.

In addition to turn signal states, the vehicle control system 100 may determine one or more details about movement of the additional vehicles 204 and 206. For example, the vehicle control system 100 may detect a relative speed, direction, or other movement of the additional vehicles 204 and 206. These movement details may further inform whether a lane change, slow down, acceleration, or other driving maneuver should be performed by the vehicle 202 to avoid collision or maintain safe driving distances between vehicles.

Figure 3:
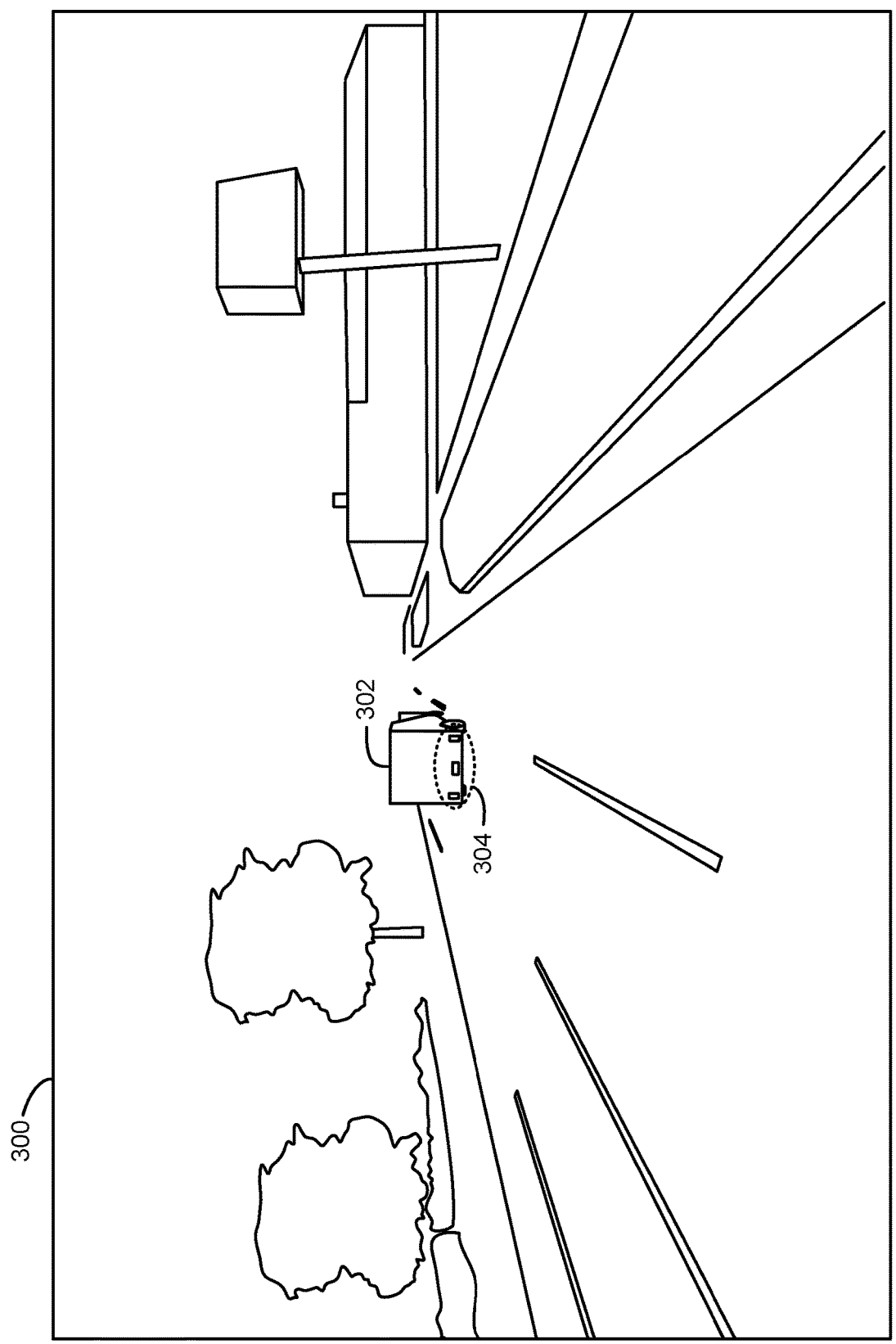
FIG. 3 illustrates a perspective view of a vehicle on a roadway.

FIG. 3 illustrates a perspective view of an image 300 that may be captured by a camera of a vehicle control system 100. The image 300 shows a rear side of a vehicle 302. A sub-portion 304 of the image includes turn signals of the vehicle 302. In one embodiment, the vehicle control system 100 may identify the sub-region 304 as a region to be processed for determining states of turn signals. For example, the vehicle control system 100 may generate a bounding box including the sub-region 304 and feed image content within the bounding box into a neural network that has been trained to detect turn signal states. Based on the state of the turn signal indicators, the vehicle control system 100 may determine that the vehicle 302 is about to change lanes or may leave a distance to allow the vehicle 302 to change lanes. Even if a turn signal has accidentally been turned on or left on, it may be beneficial if the vehicle control system 100 leaves some room for the vehicle 302. For example, an inadvertent turn signal may indicate that the vehicle 302 movements may be unpredictable due to an inattentive human operator or a software error of an automated driving system.

Figure 4:
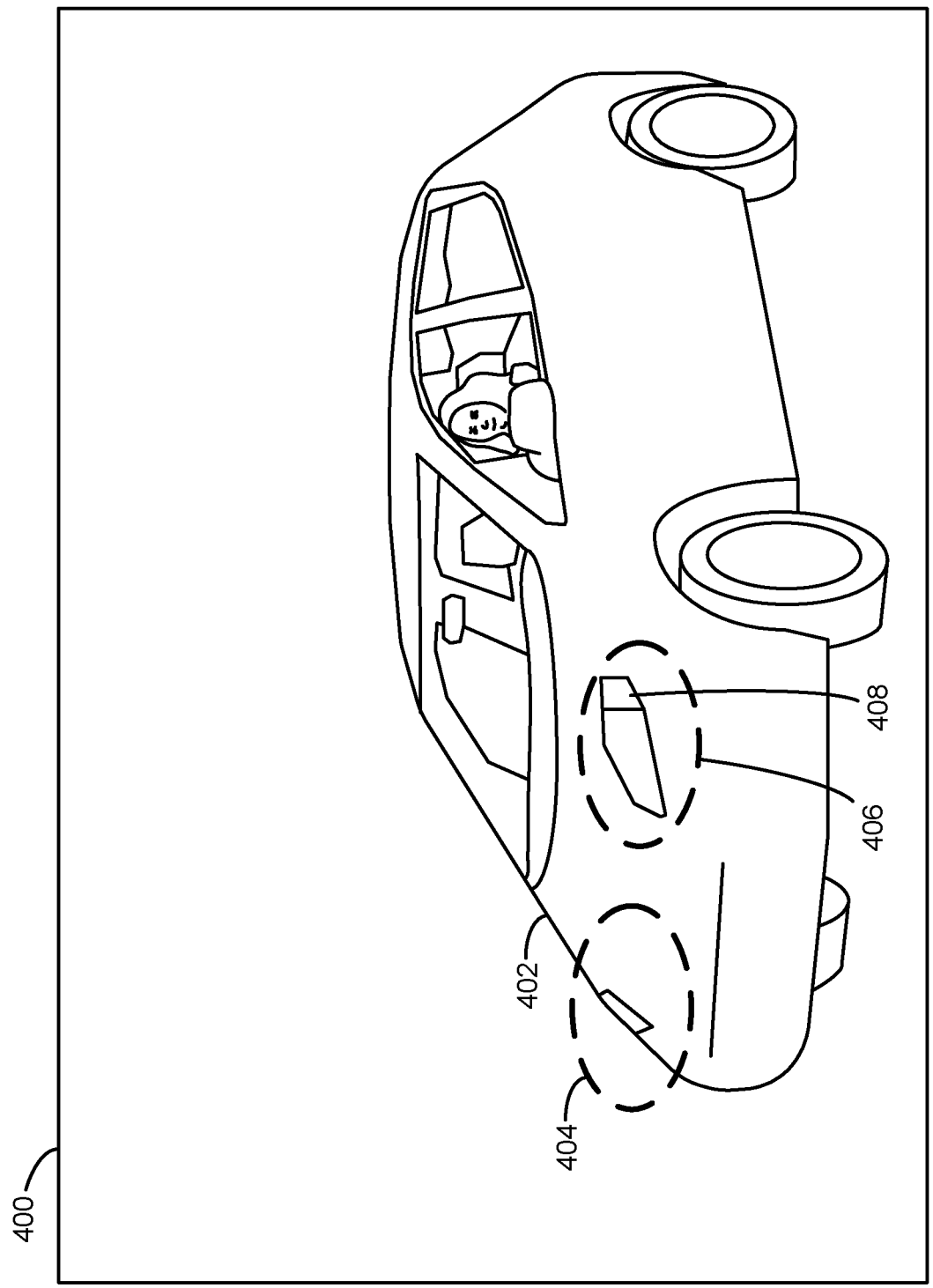
FIG. 4 illustrates a perspective view of a vehicle on a roadway.

FIG. 4 illustrates another perspective view of an image 400 that may be captured by a camera of a vehicle control system 100. The image 400 shows a front left view of the vehicle 402. For example, a rearward or sideways facing camera on a vehicle may capture the image 400 when the vehicle 402 is behind and to the right of a parent vehicle. In one embodiment, the vehicle control system 100 may identify a first sub-region 404 and a second sub-region 406 as regions to be processed for determining states of turn signals. For example, the vehicle control system 100 may generate a bounding box, including the sub-regions 404 and 406, and feed image content within the bounding boxes into a neural network that has been trained to detect turn signal states.

In the image 400, only the second sub-region 406 includes a turn signal, specifically the left turn signal 408 of the vehicle 402. A right turn signal of the vehicle 402 is out of view and is not actually visible in the first sub-region 404. Thus, only the state of one of the turn signals may be detected, namely the left turn signal 408. The vehicle control system 100 may detect the state of the left turn signal 408 and determine that no other turn signals are detectable. Based on the state of the left turn signal 408, the vehicle control system 100 may be able to predict one or more actions of the vehicle 402. For example, if the left turn signal 408 is blinking, the vehicle control system 100 may determine that the vehicle 402 is either preparing for a switch into a lane to the left of the vehicle 402 or may determine that the vehicle 402 has hazard lights flashing and thus a driver of the vehicle may be in a hurry and space should be provided to allow the vehicle 402 room to navigate. On the other hand, if the left turn signal 408 is not blinking, the vehicle control system 100 may determine that the vehicle 402 will likely remain in the same lane or move to a lane to the right of the vehicle. Because staying in the same lane or moving to the right may indicate that the vehicle 402 is not likely to make movements that would be threatening or unsafe to the vehicle that captured the image 400.

Figure 5:
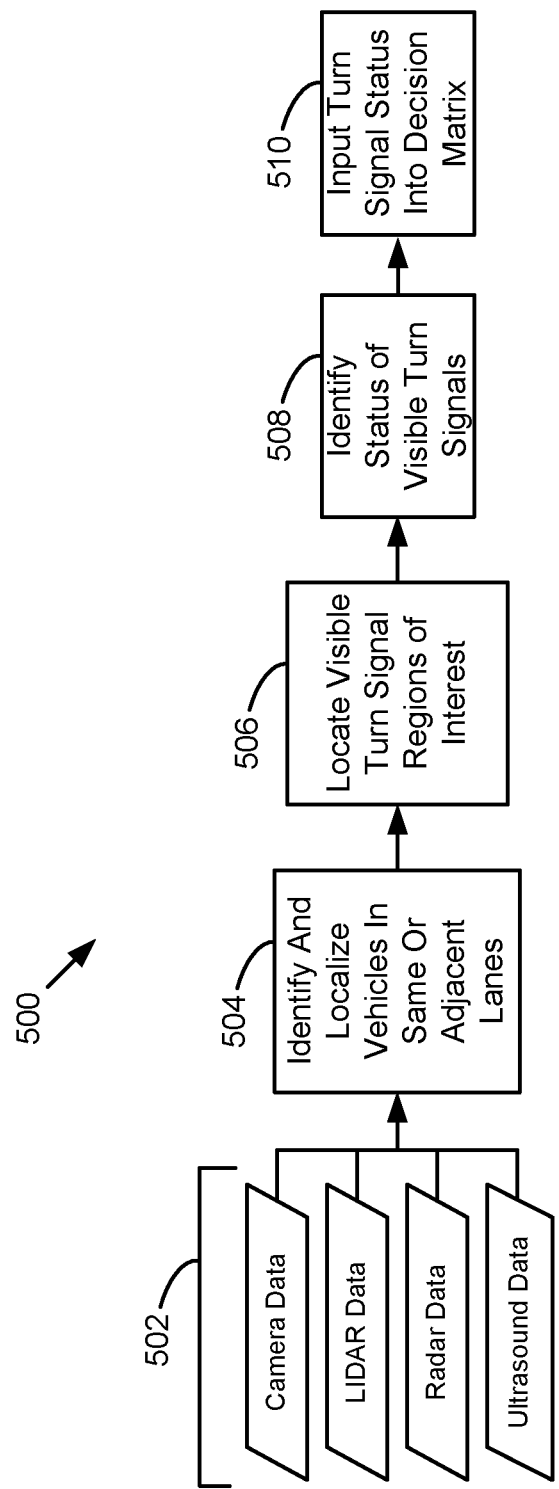
FIG. 5 is a schematic block diagram illustrating driving maneuver decision making, according to one implementation.

FIG. 5 is a schematic block diagram illustrating a method 500 for deciding on a driving maneuver. Perception data, such as camera data, LIDAR data, radar data and ultrasound data, is obtained at 502 and a driver intent component 104 identifies and localizes a vehicle based on the perception data at 504. For example, the driver intent component 104 may identify a region of a viewing area or a region of an image that corresponds to a vehicle and may localize that vehicle in a same or adjacent lane. For example, the driver intent component 104 may identify a lane of the other vehicle with respect to a parent vehicle of the driver intent component 104. The adjacent lane may include an immediately adjacent lane (e.g., to a right or left of a current lane of a vehicle) or may include a lane offset by one or more lanes from the vehicle (e.g., two lanes to the right or left of the current lane). The driver intent component 104 finds a region of interest at 506 in an image in the camera data that includes or likely includes a visible turn signal of a localized vehicle. For example, the driver intent component 104 may feed an image captured by a camera into a neural network that identifies regions including, or likely including, vehicle turn signals.

The region of interest may include a region near a front or rear bumper, a headlight, and/or a tail light. The driver intent component 104 also determines a turn signal state or identifies the status of visible turn signals at 508. For example, the driver intent component 104 may determine whether a turn signal indicator is off or blinking at 508. Furthermore, the driver intent component 104 may determine an identity of a visible turn signal as a left front, right front, left rear, and/or right rear turn signal. Furthermore, the driver intent component 104 may determine an identity of turn signals that are not visible (e.g., left front, right front, left rear, and/or right rear turn signal). The driver intent component 104 may then provide the turn signal status, and/or turn signal identity, to a decision matrix at 510. The decision matrix may include a plurality of values that may be considered in determining a future maneuver of a vehicle. For example, the matrix may be used to determine whether to change a lane, speed up, slow down, or perform any other maneuver or combination of maneuvers. In one embodiment, the matrix may be used to determine what notifications to provide to a driver of a vehicle. For example, possible notifications may include blind spot warnings, lane change instructions, or any other notifications or alerts to a human driver.

Figure 6:
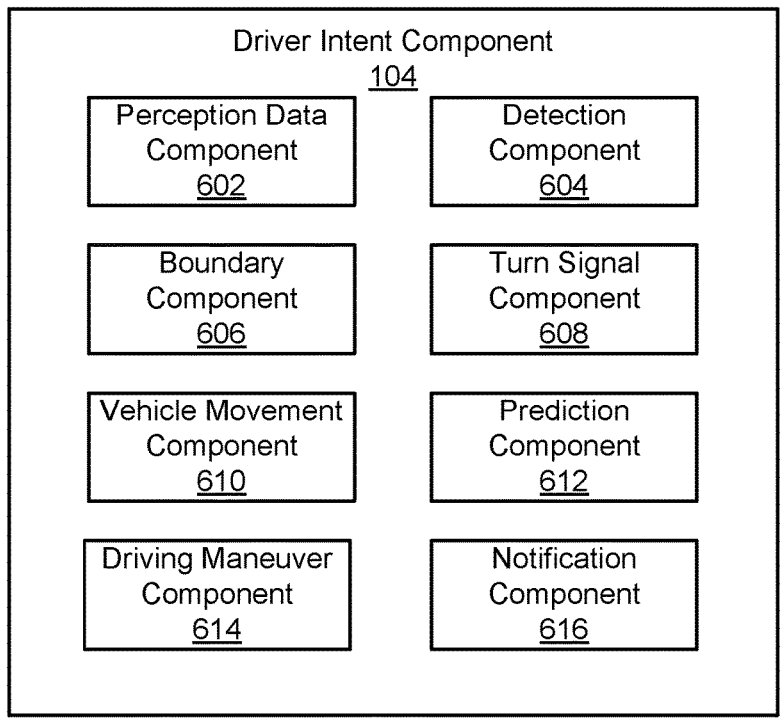
FIG. 6 is a schematic block diagram illustrating example components of a driver intent component, according to one implementation.

FIG. 6 is a schematic block diagram illustrating components of a driver intent component 104, according to one embodiment. The driver intent component 104 includes a perception data component 602, a detection component 604, a boundary component 606, a turn signal component 608, a vehicle movement component 610, a prediction component 612, a driving maneuver component 614, and a notification component 616. The components 602-616 are given by way of illustration only and may not all be included in all embodiments. In fact, some embodiments may include only one or any combination of two or more of the components 602-616. Some of the components 602-616 may be located outside the driver intent component 104, such as within the automated driving/assistance system 102 or elsewhere.

The perception data component 602 is configured to receive sensor data from one or more sensor systems of the vehicle. For example, the perception data component 602 may receive data from the radar system 106, the LIDAR system 108, the camera system 110, the GPS 112, the ultrasound system 114, or the like. In one embodiment, the perception data may include perception data for one or more regions near the vehicle. For example, sensors of the vehicle may provide a 360 degree view around the vehicle. In one embodiment, the camera system 110 captures an image of a vehicle. For example, the captured image of the vehicle may be proximal to a parent vehicle of the driver intent component 104. In one embodiment, the camera system 110 captures an image of a proximal vehicle that is in a same lane or in a lane near the vehicle and traveling in the same direction as the parent vehicle.

The detection component 604 is configured to detect a presence of one or more nearby vehicles. In one embodiment, the detection component 604 detects the nearby vehicles based on perception data gathered by the perception data component 602. For example, the detection component 604 may detect a moving object about the size of the vehicle, or may use object recognition on images obtained by a camera system 110 to detect the vehicle. In one embodiment, the detection component 604 may detect lane lines, or the like, to detect lanes or other physical features to localize vehicles with respect to a parent vehicle.

In one embodiment, the detection component 604 is configured to determine a lane of one or more of the vehicle and the proximal vehicle. For example, the detection component 604 may determine that a parent vehicle is in a first lane and that a detected proximal vehicle is in a second lane or a third lane neighboring the first lane. In one embodiment, the detection component 604 is configured to determine whether a proximal vehicle is in an adjacent lane to a current lane of the parent vehicle. The adjacent lane may be a lane immediately adjacent a current lane or may be offset by one or more intervening lanes.

In one embodiment, the detection component 604 may determine whether a detected vehicle is within a risk zone of the parent vehicle. The risk zone may be a region within a threshold distance of the parent vehicle. In one embodiment, the threshold distance may vary based on a speed or current road conditions. The risk zone may include an area where there is a risk of collision between a parent vehicle and a detected vehicle. In one embodiment, the detection component 604 may also determine whether the vehicle is moving in the same or similar direction as a parent vehicle. For example, the detection component 604 may determine whether the proximal vehicle is traveling in the same direction along the roadway as the parent vehicle.

The boundary component 606 is configured to identify a sub-region of perception data that corresponds to, or likely corresponds to, a location of a turn signal. In one embodiment, the boundary component 606 is configured to locate one or more vehicles within images or other perception data. For example, object recognition algorithms may be used to identify detected objects or obstacles as vehicles. In one embodiment, the boundary component 606 may identify a boundary of the vehicle and identify pixels or objects in that region as corresponding to the vehicle. Edge or boundary finding image processing algorithms may be used to find the edges of the vehicle.

In one embodiment, the boundary component 606 is configured to identify a sub-portion of an image (or multiple images) that contains a turn signal indicator of a vehicle. For example, the sub-portion of the image may include a turn signal indicator light positioned on a front, rear, or any other location of a vehicle. In one embodiment, the sub-portion may include a region on or near a bumper, and/or a region near a headlight or tail light of the vehicle. In one embodiment, the boundary component 606 may identify the sub-portion of the image that contains the turn signal using object recognition or edge detection image processing algorithms. For example, the boundary component 606 may identify an edge or boundary of an indicator light, headlight, tail light, or the like. In one embodiment, the boundary component 606 is configured to identify the sub-portion containing the turn signal indicator by processing the image of the proximal vehicle using a neural network trained to recognize one or more turn signal regions of interest. In one embodiment, the boundary component 606 may determine a region surrounding the turn signal indicator or a region larger than the turn signal indicator so that states of the turn signal indicator may be accurately determined even if the boundary is not perfectly aligned or centered on the turn-signal indicator.

The turn signal component 608 is configured to determine a state of a turn signal of a proximal vehicle. For example, the turn signal component 608 may determine a state of one or more turn signals of a vehicle that is located in a same or adjacent lane near a parent vehicle. In one embodiment, the turn signal component 608 may process one or more sub-regions determined by the boundary component 606 to determine the state of the turn signal indicator. For example, the turn signal component 608 may detect whether a turn signal indicator is emitting light or blinking based on one or more images of the turn signal indicator. In one embodiment, the turn signal component 608 is configured to process the sub-portion of the image using a neural network trained to determine a state of one or more turn signal indicators.

In one embodiment, the turn signal component 608 may determine whether one or more of a left turn signal indicator and a right turn indicator are on or blinking. For example, the turn signal indicator 608 may determine whether only the left turn signal indicator is flashing, only the right turn signal indicator is flashing, both the left turn signal indicator and the right turn signal indicator are flashing, or neither the left turn signal indicator nor the right turn signal indicator are flashing. In one embodiment, the turn signal component 608 may also determine whether some of the turn signal indicators of a vehicle are not visible in an image. For example, the turn signal component 608 may determine that a specific turn signal indicator has an unknown state because it is not visible, or is unknown for some other reason.

The vehicle movement component 610 is configured to detect one or more movements of a proximal vehicle. For example, the vehicle movement component 610 may detect the movements of the proximal vehicle based on perception data or other sensor data received by the perception data component 602. In one embodiment, the vehicle movement component 610 may determine one or more accelerations, decelerations, turns, or the like of a proximal vehicle. In one embodiment, the vehicle movement component 610 may detect that a vehicle is traveling in a same or similar direction as a parent vehicle. For example, the vehicle movement component 610 may determine that the proximal vehicle is traveling along a roadway in a same direction, even if the vehicle is in the same or different lane as the parent vehicle.

The boundary component 606, turn signal component 608, and/or the vehicle movement component 610 may include models, neural networks, machine learned parameters, or the like to detect body language, turn signal states, and vehicle movements. For example, guided or unguided machine learning algorithms may process perception data from real-world or virtual environments to learn shapes, movements, or other image content that corresponds to body language, turn signal states, or vehicle movement. The results of these machine learning algorithms may be included in models or databases for use by respective components to detect the body language, turn signal states, or vehicle movement during driving of a vehicle.

The prediction component 612 may infer a driver's intention or predict future motions of a nearby vehicle based determinations by the turn signal component 608, the vehicle movement component 610, and/or other information. For example, the prediction component 612 may predict future motion, and/or a timing for the future motion, based on a state of a turn signal indicator and/or detected vehicle movements. In one embodiment, the prediction component 612 determines the driver's intention or predicts future motions. For example, the prediction component 612 may determine a timing and a movement that the driver intends to perform. Example movements may include a turn onto a different road, waiting at an intersection, merging with traffic, changing lanes, exiting a roadway, entering a roadway, parking a vehicle, exiting a parking spot, or the like.

In one embodiment, the prediction component 612 references or processes a database or model to determine a predicted movement or intended movement of another vehicle. For example, the prediction component 612 may use a neural network that has been trained to determine a future vehicle movement based on detected vehicle movements and/or the status of a turn signal. In one embodiment, the database or model also correlates an intention of a driver or a future driving maneuver based on a current driving context. For example, the same gestures may mean different things based on whether the nearby vehicle or parent vehicle is stopped at an intersection, approaching an intersection, driving down a road with one or more nearby vehicles, merging onto a roadway, exiting a roadway, entering a parking lot or parking spot, exiting a parking lot or parking spot, or the like. Thus, gestures and current driving context may be used to accurately infer an intention of a driver or predict a future driving maneuver. The prediction component 612 may provide the predicted driving maneuvers or driver intent to the driving maneuver component 614 or the automated driving/assistance system 102 for decision making and for maneuvers or actions to be taken by the automated driving/assistance system 102 or a parent vehicle.

In one embodiment, the prediction component 612 determines the driver's intention or predicts future motions of the vehicle based on a state of a turn signal indicator as determined by the turn signal component 608. For example, the prediction component 612 may predict a timing and direction of travel for the vehicle to change lanes, merge, or exit a roadway. In one embodiment, the prediction component 612 references or processes the data based on a neural network to determine the predicted movement or intended movement of another vehicle. For example, the prediction component 612 may include or access a database or model that correlates turn signal statuses with one or more future vehicle movements. In one embodiment, the database or model may correlate a blinker direction with the vehicle changing direction in that direction. In one embodiment, the database or model may correlate a flashing of hazard lights (e.g., both or all detectable turn signal indicators blinking) with a vehicle moving quickly down a roadway in an unpredictable direction without waiting according to normal protocols. Thus, extra distance and leeway may be provided to the vehicle with flashing hazard lights (or flashing emergency lights) to move down the roadway.

In one embodiment, the prediction component 612 determines the driver's intention or predicts future motions based on detected movements of the vehicle as determined by the vehicle movement component 610. For example, the prediction component 612 may predict a timing and direction of travel for the vehicle to move through the intersection. In one embodiment, the prediction component 612 references or processes the database or model to determine the predicted movement or intended movement of another vehicle. For example, the prediction component 612 may include or access a database or model that correlates one or more detected movements with one or more future movements. For example, the database may include an acceleration, velocity, deceleration, or other movement information with a predicted further movement through an intersection. In one embodiment, the prediction component 612 may predict a lane change from the adjacent lane into a same lane as the first vehicle. In one embodiment, the prediction component 612 may predict that a proximal vehicle may change lanes in direction corresponding to a side of the vehicle on which a turn signal indicator is active or blinking.

In one embodiment, the prediction component 612 may determine a driver's intention or future movement of a vehicle based on a combination of data from the turn signal component 608, vehicle movement component 610, or other data. For example, a neural network or graphical model may include machine learning values or correlations for one or more of turn signal information and vehicle movements.

The driving maneuver component 614 is configured to select a driving maneuver for a parent vehicle based on the predicted driver intent or future driving maneuver of another vehicle. For example, the driving maneuver component 614 may receive one or more predicted driving maneuvers for one or more nearby vehicles from the prediction component 612. The driving maneuver may determine a driving path to avoid collision with the other vehicles in case they perform the predicted driving maneuvers. For example, the driving maneuver component 614 may determine whether to decelerate, accelerate, and/or turn a steering wheel of the parent vehicle. In one embodiment, the driving maneuver component 614 may determine a timing for the driving maneuver. For example, the driving maneuver component 614 may determine that a parent vehicle should wait to perform a lane change or perform a lane change at a specific time because another vehicle is likely to be near the vehicle in that lane.

In one embodiment, the driving maneuver component 614 may select a driving maneuver based directly on data gathered by the turn signal component 608, vehicle movement component 610, and/or other components of the driver intent component 104. For example, the driving maneuver component 614 may select a driving maneuver based on a state of a turn signal indicator and/or a location and velocity of another vehicle. In one embodiment, a selected driving maneuver may be a suggested driving maneuver that is provided to a driver or a system that makes driving or navigation maneuvers. In one embodiment, the driving maneuver component 614 may enter or include data or determinations from the turn signal component 608, vehicle movement component 610, and/or the prediction component 612 in a decision matrix. For example, the decision matrix may include a matrix that is processed using a neural network or a processing algorithm to determine a maneuver the parent vehicle should perform. In one embodiment, the decision matrix may include a matrix for deciding whether and/or when to perform a lane change.

The notification component 616 is configured to provide one or more notifications to a driver or automated driving system of a vehicle. In one embodiment, the notification component 616 may provide notifications to a driver using a display 122 or speaker 124. In one embodiment, the notification may include an instruction to perform a maneuver or may warn that another vehicle is likely to perform a specific maneuver or be at a specific location at a predicted time. In one embodiment, the notification component 616 may notify the driver or automated driving system of a driving maneuver selected or suggested by the driving maneuver component 614. In one embodiment, the notification component 616 may notify the driver or automated driving system of a predicted future movement of another vehicle as determined by the prediction component 612.

Figure 7:
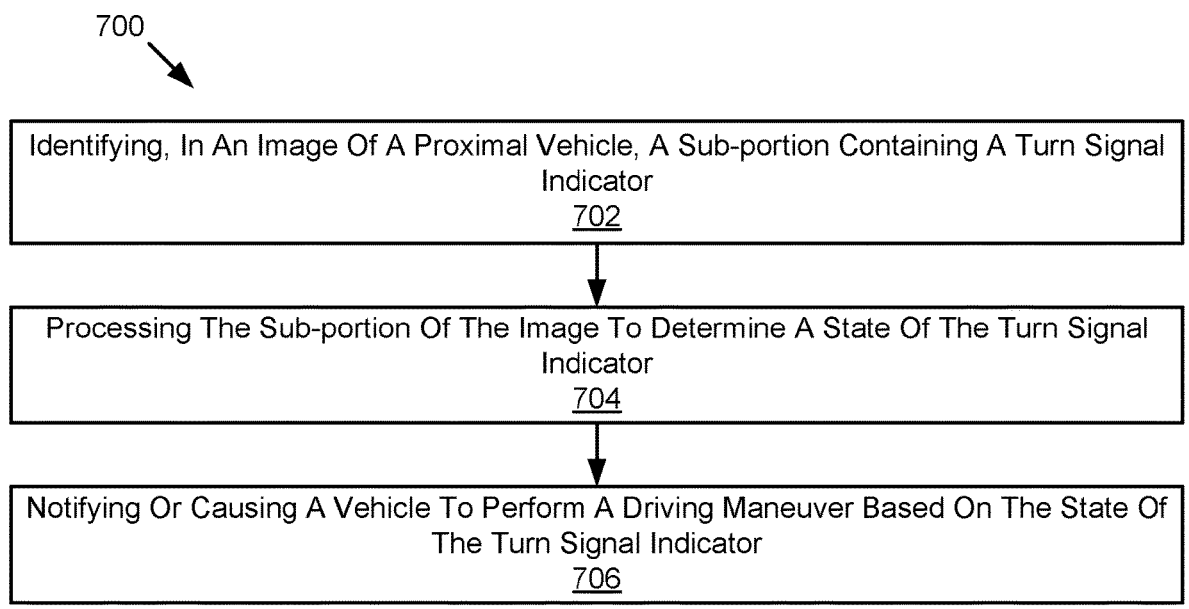
FIG. 7 is a schematic block diagram illustrating a method for driver decision making, according to one implementation.

Referring now to FIG. 7, a schematic flow chart diagram of a method 700 for vehicle maneuver decision making, according to one embodiment, is illustrated. The method 700 may be performed by an automated driving/assistance system or a driver intent component, such as the automated driving/assistance system 102 of FIG. 1 or the driver intent component 104 of FIG. 1 or 6.

The method 700 begins as a boundary component 606 identifies, in an image of a proximal vehicle, a sub-portion containing a turn signal indicator of the proximal vehicle at 702. A turn signal component 608 processes the sub-portion of the image to determine a state of the turn signal indicator at 704. A notification component 616 notifies a driver or a driving maneuver component 614 causes a vehicle to perform a driving maneuver based on the state of the turn signal indicator of the proximal vehicle at 706.

EXAMPLES

The following examples pertain to further embodiments.

Example 1 is a method that includes detecting, at a first vehicle, a presence of a second vehicle in an adjacent lane. The method also includes identifying, in an image of the second vehicle, a sub-portion containing a turn signal indicator of the second vehicle. The method further includes processing the sub-portion of the image to determine a state of the turn signal indicator. The method also includes notifying a driver or performing a driving maneuver, at the first vehicle, based on the state of the turn signal indicator.

In Example 2, identifying the sub-portion containing the turn signal indicator in Example 1 includes processing the image of the second vehicle using a neural network trained to recognize one or more turn signal regions of interest. Furthermore, processing the sub-portion of the image includes processing a portion of the image comprising the one or more turn signal regions of interest.

In Example 3, processing the sub-portion of the image in any of Examples 1-2 includes processing the sub-portion using a neural network trained to determine a state of one or more turn signal indicators.

In Example 4, the method of any of Examples 1-3 further includes determining the driving maneuver for the first vehicle based on the state of the turn signal indicator.

In Example 5, determining the driving maneuver in Example 4 includes providing the state of the turn signal indicator into a lane-changing decision matrix and processing the lane-changing decision matrix to select the driving maneuver.

In Example 6, notifying the driver in Example 4 includes notifying the driver of the determined driving maneuver.

In Example 7, the method of any of Examples 1-6 further includes predicting future movement of the second vehicle based on a state of the turn signal indicator.

In Example 8, predicting future movement in Example 7 includes predicting a lane change from the adjacent lane into a same lane as the first vehicle.

In Example 9, notifying the driver in Example 7 includes notifying the driver of the predicted future movement of the second vehicle.

In Example 10, the method of any of Examples 1-9 further include determining a direction of movement of the first vehicle corresponding to the state of the turn signal indicator.

Example 11 is a driving control system for a vehicle that includes one or more sensors for obtaining sensor data in a region near a vehicle that include a camera. The driving control system also includes a boundary component, a turn signal component, and a driving maneuver component. The boundary component is configured to identify a sub-portion of an image containing a turn signal indicator of a proximal vehicle. The turn signal component is configured to process the sub-portion of the image to determine a state of the turn signal indicator. The driving maneuver component is configured to determine a driving maneuver for the first vehicle based on the state of the turn signal indicator.

In Example 12, the driving maneuver in Example 12 includes a suggested driving maneuver and the driving control system further includes a notification component configured to provide the suggested driving maneuver to a human driver or an automated driving system.

In Example 13, the boundary component in any of Examples 11-12 is configured to identify the sub-portion containing the turn signal indicator by processing the image of the proximal vehicle using a neural network trained to recognize one or more turn signal regions of interest. The turn signal component is configured to process the sub-portion of the image by processing a portion of the image comprising the one or more turn signal regions of interest.

In Example 14, the driving control system of any of Examples 11-13 further includes a detection component configured to determine that the proximal vehicle is within a risk zone with respect to the vehicle. The driving control system is configured to obtain the image in response to the detection component determining that the proximal vehicle is within the risk zone.

In Example 15, the driving control system of any of Examples 11-14 further includes a detection component configured to determine a lane of one or more of the vehicle and the proximal vehicle.

Example 16 is a computer readable storage media storing instructions that, when executed by one or more processors, cause the one or more processors to obtain, at a first vehicle, a plurality of images of a second vehicle on a road near the first vehicle. The instructions further cause the one or more processors to identify a sub-portion of the plurality of images containing a turn signal indicator of the second vehicle. The instructions further cause the one or more processors to process the sub-portion of the plurality of images to determine a state of the turn signal indicator. The instructions further cause the one or more processors to predict a driving maneuver for the second vehicle based on the state of the turn signal indicator.

In Example 17, the instructions of Example 16 further cause the one or more processors to determine a driving maneuver for the first vehicle based on the predicted driving maneuver for the second vehicle.

In Example 18, the instructions in any of Examples 16-17 further cause the one or more processors to determine whether or not to cause the first vehicle to perform a lane change based on the turn signal indicator.

In Example 19, the instructions in any of Examples 16-18 further cause the one or more processors to determine that the second vehicle is one or more of: in a lane immediately adjacent a lane of the first vehicle; driving in a similar direction along a roadway as the first vehicle; and within a risk zone of the first vehicle, wherein the risk zone corresponds to an area where there is a risk of collision between the first vehicle and the second vehicle.

In Example 20, the instructions in any of Examples 16-19 further cause the one or more processors to determine that the state of the turn signal indicator corresponds to a direction of movement of the first vehicle.

Example 21 is a system or device that includes means for implementing a method or realizing a system or apparatus in any of Examples 1-20.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
    detecting, at a first vehicle, a presence of a second vehicle in an adjacent lane;
    identifying, in an image of the second vehicle, a sub-portion of the image containing a turn signal indicator of the second vehicle, wherein identifying the sub-portion containing the turn signal indicator comprises processing the image of the second vehicle using a first neural network trained to recognize one or more turn signal regions of interest;
    processing the sub-portion of the image to determine a state of the turn signal indicator using a second neural network trained to determine a state of one or more turn signal indicators;
    processing the state of the turn signal indicator with a decision matrix to predict a future maneuver of the second vehicle; and
    notifying a driver or performing a driving maneuver, at the first vehicle, based at least in part on the predicted future maneuver of the second vehicle.

2. The method of claim 1, wherein processing the state of the turn signal indicator with the decision matrix comprises providing the state of the turn signal indicator to a neural network configured to execute the decision matrix.

3. The method of claim 2, wherein the decision matrix is further configured to predict whether the first vehicle should perform one or more of a lane change or a change in velocity.

4. The method of claim 1, wherein notifying the driver comprises notifying the driver of the predicted future maneuver of the second vehicle.

5. The method of claim 1, wherein processing the state of the turn signal indicator comprises processing to predict whether the second vehicle is likely to make a lane change.

6. The method of claim 1, wherein processing the state of the turn signal indicator comprises processing to predict whether the second vehicle is likely to make a lane change from the adjacent lane into a same lane as the first vehicle.

7. The method of claim 1, wherein identifying the sub-portion of the image containing the turn signal indicator comprises determining a bounding box in the image, wherein the bounding box comprises one or more turn signal indicators.

8. The method of claim 1, wherein processing the sub-portion of the image to determine the state of the turn signal indicator comprises providing the sub-portion of the image to the second neural network, wherein the second neural network is configured to execute a computer vision algorithm to recognize whether the turn signal indicator is in use.

9. A driving control system for a vehicle, the system comprising:
    one or more sensors for obtaining sensor data in a region near a first vehicle, the one or more sensors comprising a camera; and
    one or more processors configured to execute instructions stored in non-transitory computer readable storage media, the instructions comprising:
        detecting, at the first vehicle, a presence of a second vehicle in an adjacent lane;
        identifying a sub-portion of an image containing a turn signal indicator of the second vehicle by processing the image of the second vehicle using a first neural network trained to recognize one or more turn signal regions of interest;
        processing the sub-portion of the image to determine a state of the turn signal indicator using a second neural network trained to determine a state of one or more turn signal indicators;
        processing the state of the turn signal indicator with a decision matrix to predict a future maneuver of the second vehicle; and
        providing a notification to a driver or an automated driving system of the first vehicle based at least in part on the predicted future maneuver of the second vehicle.

10. The driving control system of claim 9, wherein the instructions further comprise determining a driving maneuver for the first vehicle based at least in part on the predicted future maneuver of the second vehicle.

11. The driving control system of claim 9, wherein the instructions further comprise determining that the second vehicle is within a risk zone with respect to the first vehicle.

12. The driving control system of claim 9, wherein the instructions further comprise determining a lane of one or more of the first vehicle or the second vehicle.

13. Non-transitory computer readable storage media storing instructions for execution by one or more processors, the instructions comprising:
- detecting, at a first vehicle, a presence of a second vehicle in an adjacent lane;
- identifying, in an image of the second vehicle, a sub-portion of the image containing a turn signal indicator of the second vehicle, wherein identifying the sub-portion containing the turn signal indicator in the image comprises processing the image using a first neural network trained to recognize one or more turn signal regions of interest;
- processing the sub-portion of the image to determine a state of the turn signal indicator using a second neural network trained to determine a state of one or more turn signal indicators;
- processing the state of the turn signal indicator with a decision matrix to predict a future maneuver of the second vehicle; and
- notifying a driver or an automated driving system, at the first vehicle, of the predicted future maneuver of the second vehicle.

14. The non-transitory computer readable storage media of claim 13, wherein the instructions are such that processing the state of the turn signal indicator comprises processing to predict whether the second vehicle is likely to make a lane change from the adjacent lane into a same lane as the first vehicle.

15. The non-transitory computer readable storage media of claim 13, wherein the instructions further comprise determining whether or not to cause the first vehicle to perform a lane change based at least in part on the turn signal indicator.

16. The non-transitory computer readable storage media of claim 13, wherein the instructions further comprise determining whether the second vehicle is one or more of:
- in a lane immediately adjacent a lane of the first vehicle;
- driving in a similar direction along a roadway as the first vehicle; or
- within a risk zone of the first vehicle, wherein the risk zone corresponds to an area where there is a risk of collision between the first vehicle and the second vehicle.

17. The non-transitory computer readable storage media of claim 13, wherein the instructions further comprise determining whether the state of the turn signal indicator corresponds with a direction of movement of the first vehicle.

* * * * *